(12) United States Patent
Nakamura et al.

(10) Patent No.: US 8,077,199 B2
(45) Date of Patent: Dec. 13, 2011

(54) TARGET POSITION IDENTIFYING APPARATUS

(75) Inventors: Yoshihiro Nakamura, Nagoya (JP); Etsuo Yamada, Nagoya (JP); Keiji Takagi, Konan (JP); Masataka Chiba, Toyota (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 0 days.

(21) Appl. No.: 13/001,061

(22) PCT Filed: Jul. 17, 2009

(86) PCT No.: PCT/JP2009/062977
§ 371 (c)(1),
(2), (4) Date: Dec. 23, 2010

(87) PCT Pub. No.: WO2010/016379
PCT Pub. Date: Feb. 11, 2010

(65) Prior Publication Data
US 2011/0102581 A1   May 5, 2011

(30) Foreign Application Priority Data

Aug. 5, 2008  (JP) .................................. 2008-202027

(51) Int. Cl.
*H04N 7/18* (2006.01)
(52) U.S. Cl. ........ 348/135; 348/140; 348/143; 348/142; 348/148; 348/136; 348/137; 348/141; 382/103; 382/199; 382/165
(58) Field of Classification Search .................. 348/135, 348/140, 143, 142, 148, 136, 137, 141; 382/103, 382/199, 165
See application file for complete search history.

(56) References Cited

U.S. PATENT DOCUMENTS

| 5,940,531 | A | * | 8/1999 | Watanabe et al. | ............. 382/165 |
| 6,118,552 | A | * | 9/2000 | Suzuki et al. | ................. 382/166 |
| 6,137,893 | A | | 10/2000 | Michael et al. | |

(Continued)

FOREIGN PATENT DOCUMENTS

JP        08-161508 A     6/1996

(Continued)

OTHER PUBLICATIONS

Co-pending U.S. Appl. No. 12/552,694, filed Sep. 2, 2009.

(Continued)

*Primary Examiner* — Shawn An
(74) *Attorney, Agent, or Firm* — Sughrue Mion, PLLC

(57) ABSTRACT

A target position identifying apparatus includes a color difference converting section for processing pixel values of an image of a target comprised of combination of a first color and a second color obtained from the target under influence of ambient light, thus generating a color component value of the first color, a color component value of the second color and a luminance value, a color region determining section for determining region of the first color and region of the second color, based on the first color component value and the second color component value, with using a determination condition based on either luminance of the captured image or the luminance value, a border detecting section for detecting border between the first color and the second color in the target based on result of the determination by the color region determining section and a target position calculating section for calculating the position of the target on the image based on result of the border detection by the border detecting section.

11 Claims, 4 Drawing Sheets

U.S. PATENT DOCUMENTS

| | | | |
|---|---|---|---|
| 6,256,411 B1 * | 7/2001 | Iida | 382/203 |
| 7,423,666 B2 * | 9/2008 | Sakakibara et al. | 348/136 |
| 2003/0137510 A1 | 7/2003 | Massen | |
| 2008/0031514 A1 | 2/2008 | Kakinami | |
| 2008/0101693 A1 | 5/2008 | Young et al. | |
| 2010/0082281 A1 | 4/2010 | Nakamura et al. | |

FOREIGN PATENT DOCUMENTS

| | | |
|---|---|---|
| JP | 09-153139 A | 6/1997 |
| JP | 2002-354506 A | 12/2002 |
| JP | 2005-016979 A | 1/2005 |
| JP | 2006-162442 A | 6/2006 |
| JP | 2007-225809 A | 9/2007 |
| JP | 2008-131177 A | 6/2008 |
| JP | 2008-131250 A | 6/2008 |

OTHER PUBLICATIONS

Notification of Transmittal of the International Preliminary Report on Patentability dated Mar. 17, 2011 for corresponding PCT/JP2009/062977.

International Search Report issued in PCT/JP2009/062977 dated Oct. 27, 2009.

European Search Report dated Aug. 5, 2011, issued in corresponding European Patent Application No. 09804866.

* cited by examiner

TARGET POSITION IDENTIFYING APPARATUS

TECHNICAL FIELD

The present invention relates to a target position identifying apparatus for identifying a position of a target in a captured image through image processing of captured image data of the target comprising combination of a first color and a second color.

BACKGROUND ART

In recent years, there have been an ever increasing number of vehicles mounting a camera for allowing a driver of the vehicle to view e.g. a scene laterally or rearwardly of the vehicle on a monitor device provided inside the vehicle. Further, there has been developed an apparatus for assisting driving such as driving for parking by effecting e.g. image processing utilizing this camera's captured image. Especially, in the case of a camera configured to capture an image for use e.g. as a basis for generating information to be utilized for positioning of the vehicle, high precision is required in its calibration such as optical axis adjustment. The above-described target position identifying apparatus is used for such calibration processing for the car-mounted camera. For instance, according to one known technique relating to the above technique, a car-mounted camera is used for capturing images of makers (targets) having a black-and-white, checkerboard pattern and disposed at two positions within the field of view of the camera. The center point (calibration point) of the marker is detected through image processing to be utilized for calibration of the car-mounted camera (e.g. Patent Document 1). This technique requires precision detection of the center point of the black-and-white checkerboard pattern. However, depending on the condition of the illuminating light or sunlight, precision of detection of the edge of the white and black regions may become unstable, thus resulting in deterioration in the precision of the maker center point detection.

Also, in the field of art relating to an image scanner provided for effecting precision detection of a target recorded in advance on an original document for the purpose of position alignment of the document, there is known an image signal processing apparatus for effecting the target position detection. In this apparatus, the target is provided in the form of a concentric pattern of red, blue and green regions. Image signals obtained from this target are converted into color difference signals and these color difference signals are used for the target position detection (see Patent Document 2). In this technique, since the color difference signals are utilized for the target detection, availability of sufficient color information (color difference components) of the predetermined target pattern in the captured image signals of the target is the prerequisite for ensuring precision in the position detection. In this regard, in the case of an image scanner, influence from external light is negligible inherently. Hence, it may be considered that precise color difference components are retained in the captured image signals of the target. On the other hand, in the case of target imaging by a car-mounted camera, the imaging (image-capturing) of the target is done under the influence of ambient light. Therefore, with using color difference signals alone, precision target position detection is difficult. Moreover, an erroneous recognition may occur when e.g. some object which looks similar to the pattern of the target is placed inadvertently within the view field of the camera. To avoid this, troublesome management of the working environment will be needed.

PRIOR ART DOCUMENT

Patent Document 1: Japanese Patent Application "Kokai" No. 2008-131250 (paragraphs 00232-00402, FIG. 1)
Patent Document 2: Japanese Patent Application "Kokai" No. Hei. 9-153139 (paragraphs 0017-0030, FIG. 1)

SUMMARY OF THE INVENTION

Object to be Accomplished by Invention

In view of the above-described state of the art, the primary object of the present invention is to provide a target position identifying apparatus capable of effecting, with high precision, detection and position calculation of a target comprised of combination of a plurality of colors, even from image data obtained under influence of ambient light.

Means for Accomplishing the Object

For accomplishing the above-noted object, according to the characterizing feature of a target position identifying apparatus relating to the present invention, the apparatus comprises:

a color difference converting section for processing pixel values of an image of a target comprised of combination of a first color and a second color obtained from the target under influence of ambient light, thus generating a color component value of the first color, a color component value of the second color and a luminance value;

a color region determining section for determining region of the first color and region of the second color, based on the first color component value and the second color component value, with using a determination condition based on either luminance of the captured image or said luminance value;

a border detecting section for detecting border between the first color and the second color in the target based on result of the determination by said color region determining section; and a target position calculating section for calculating the position of the target on the image based on result of the border detection by the border detecting section.

With this characterizing feature, the captured image data obtained by imaging the target is processed and converted into color difference information comprised of the first color component value, the second color component value and the luminance value. But, the region of the first color and the region of the second color are not determined simply from the first color component value and the second color component value thus obtained. Rather, for the determination of the first color region and the second color region of the target, there is employed determination condition which is set based on either the luminance of the captured image per se or the luminance value contained in the color difference information. Meanwhile, if the captured image is represented by the RGB color representation system, in order to obtain its luminance by a simple method, this can be done simply by adding up the R value, the G value and the B value and then dividing the resultant sum by three. For instance, in the case of a target image which was obtained by imaging in a dimly-lit environment, there occurs reduction in the overall luminance or in the luminance value in the color difference information and there occurs also shifting of the color components constituting the target toward the achromatic side. Taking the above into consideration, according to the present invention, the determination condition utilized for detection determination of a particular color is set based on the luminance of the captured image per se or the luminance value included in the color difference information. With this, there are realized detection of the first color region and the second color region constituting the target which remains stable even with variation in the ambient light illuminating this target and target position calculation based on the detection of the border between these regions. With this construction, management in the working site against erroneous recognition can be simple, i.e. the management requiring only that no combination of similar colors be present within the field of view of the camera.

Further, in the characterizing feature of the target position identifying apparatus relating to the present invention, preferably, said first color is blue, said second color is red; and said luminance value, said first color component value and said second color component value are respectively a Y value, a Cb value and a Cr value in the YCbCr color representation system. As the Cb value (blue component) and the Cr value (red component) are in the extreme opposite relationship to each other, it becomes also possible to effect precision blue determination and red determination, from a difference between the Cb value and the Cr value. Also, since the YCbCr color representation system is often employed for video signals in a television broadcast etc., its processing devices can be readily and inexpensively available. Moreover, a target comprising the combination of blue and red is readily visually recognizable by humans. Hence, such target is convenient in this respect also.

According to a further preferred characterizing feature of the target position identifying apparatus relating to the present invention, said determination condition is variable in accordance with the luminance of the captured image or said luminance value in such a manner that a range for the color component value for determining that a pixel of the captured image belongs to either one of said color regions is narrowed in accordance with increase in the luminance of the captured image or said luminance value. If the luminance of the captured image or the luminance value is large or high, this means that the amount of light illuminating the target is large, so that the respective color difference component value too is large, but the noise component too can be larger at the same time. Therefore, by setting the determination condition (threshold) more strict, that is, by narrowing the range of color component value for determining that a pixel in the captured image belongs in either of the color regions, it is possible to eliminate noise. Conversely, if the luminance of the captured image or said luminance value is small or low, this means that the amount of light illuminating the target is small, so that the respective color difference component value too is small, but the noise component too can be small. Therefore, by setting the determination condition less strict, that is, by broadening the range of color component value for determining that a pixel in the captured image belongs in either of the color regions, detection of a particular color can be effected in more stable manner.

As one preferred example of this determination condition, the invention proposes a particular color detection threshold value: TH. This particular color detection threshold value: TH can be obtained by the following formula.

$$TH = VA\_avg + K \times (VH\_avg - VA\_av)$$

where VA_avg: the average value of the color component value to be determined for all pixels of the captured image, VH_avg: an upper level average value corresponding to the color component corresponding red region of the color component values of those pixels having upper level values of the determination subject color component of all the pixels of the captured image, and K: a preset constant value. Incidentally, an example of a pixel whose color component value belongs in the upper level is a pixel whose color component value is within predetermined ranking order from the top, e.g. a pixel whose color component value is within predetermined percentage of the maximum color component value. Alternatively, an upper level range can be set from a histogram of the color component values and those pixels having color component values confined within this range may be determined as pixels belonging in the upper level. The threshold value: TH calculated in this way becomes greater as the luminance level of the captured image increases (determination condition rendered more strict), whereas the threshold value: TH becomes smaller as the luminance level decreases (determination condition rendered less strict).

According to a further preferred characterizing feature of the target position identifying apparatus relating to the present invention, said target comprises a checkerboard pattern. A checkerboard pattern is created by repetition of rectangular faces having at least two different colors. Therefore, by choosing colors having significantly different pixel values for the different colors in the captured image, its pattern layout can be easily detected by a simple image processing operation, so that its detection reliability will improve. In particular, a border between different colors is detectable by a simple edge detecting technique. Hence, coordinates of a crossing point of a pair of borderlines of differing directions together delimiting the checkerboard pattern can be used as the target position advantageously. With this, a single point is calculated as the target position, thus realizing target position identification with high precision. In implementing this technique, if the position coordinates of the target are known in advance, the positional relationship relative to the camera on the captured image can be calculated. Hence, the target layout can be freely set.

According to a further preferred characterizing feature of the target position identifying apparatus relating to the present invention, the surface of the target is provided with matting treatment. With this, it is possible to restrict external disturbance on the captured image due to reflection of the illumination light, etc.

One preferred mode of application of the target position identifying apparatus relating to the present invention is calibration of the mounting position of a camera mounted on a vehicle. That is, as the captured image, there is employed an image captured by the vehicle-mounted camera and evaluation of the mounting position of the camera is effected based on the position of the target in the captured image calculated by the target position calculating section. In such mode of application, preferably, the target is formed by means of e.g. painting on the road or floor surface on which the vehicle travels. However, in this case, there is the possibility of the target being treaded upon by the wheels of the vehicle, so the recognition characteristics of the target may deteriorate. In order to restrict this problem, if the target is provided in the form of a pair of targets juxtaposed along the right/left direction of the vehicle, it is proposed to set these targets with a distance therebetween smaller than the tread width of the vehicles so that the right and left wheels of the vehicle may stride across the two targets. Or, it is proposed to set the targets with a distance therebetween greater than the tread width of the vehicles so that the vehicle may pass between the targets. For, these arrangements both reduce the possibility of the targets being treaded upon by the right and left wheels of the vehicle.

MODE OF EMBODYING THE INVENTION

Next, embodiments of the present invention will be explained with reference to the accompanying drawings.

Figure 1:
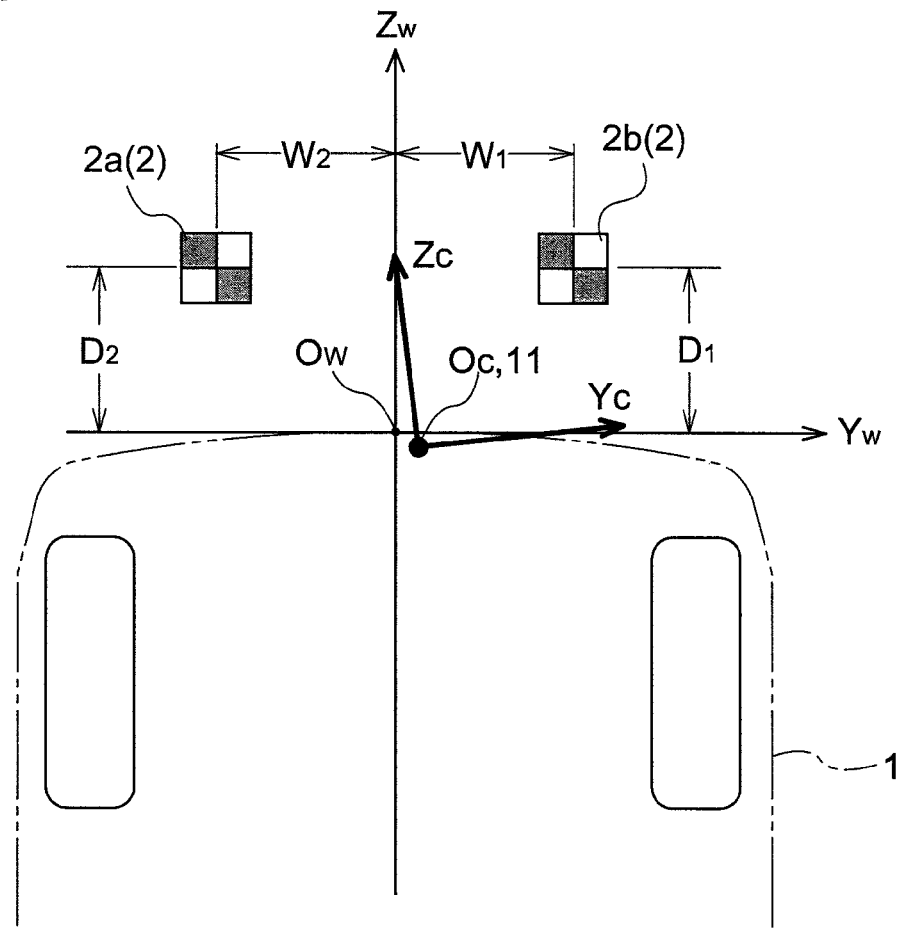
FIG. 1 is an explanatory diagram showing one example of layout relationship between targets and a vehicle for the purpose of camera calibration.

FIG. 1 is an explanatory diagram showing one example of layout relationship between calibration targets 2 (calibration indices) and a vehicle 1. A camera 11 (vehicle-mounted camera) is mounted upwardly of a rear number plate of the vehicle 1 with an amount of lateral offset relative to the longitudinal axis of the vehicle body and with an optical axis of the camera being oriented downwards (e.g. 30 degrees downward relative to the horizontal). Meanwhile, in this embodiment, the longitudinal axis of the vehicle body and the optical axis of the camera are not parallel with each other. The camera 11 is a wide-angle camera having a horizontal view angle of from 110 to 120° C. and is capable of capturing an image of an area extending about 8 meters rearward. This camera 11 is calibrated for absorbing mounting error or tolerance when it is mounted on the vehicle 1 in e.g. a vehicle manufacturing factory. Calibration of the camera 11 may also take place in a repair factory or the like, for correcting displacement thereof which may have occurred due to accumulated vibrations or shocks during traveling. The following explanation will be given by way of an example of a determining operation of camera mounting precision for the purpose of calibration of the camera in a vehicle manufacturing factory.

As shown in FIG. 1, the calibration of the camera 11 is effected with the vehicle 1 being stopped at a predetermined position. For instance, if the vehicle 1 is driven forward or reverse to stop its wheels inside wheel grooves or against tire stops provided at predetermined positions, the vehicle 1 can be stopped at a precise position. In the case of the example shown in FIG. 1, two targets 2 (2a, 2b) are disposed on the floor surface. As may be apparent from the figure, the distance between the two targets 2a, 2b is made narrower than the tread width of the vehicle 1, thus making it less likely for the targets 2 to be treaded upon by the wheels of the vehicle 1. Conversely, the distance between the two targets 2a, 2b can be set wider than the tread width of the vehicle 1, thus again making it less likely for the targets 2 to be treaded upon by the wheels of the vehicle 1.

In FIG. 1, the vehicle 1 is stopped so that the floor surface at the rear end center is aligned with the origin OW of world coordinate system (reference coordinate system, XW, YW, ZW). In this example, the respective axes of the camera coordinate system (XC, YC, ZC) centering about the optical center OC of the camera 11 are not parallel with the world coordinate system respectively. Both the world coordinate system and the camera coordinate system are right-handed coordinate system, so that in the figure, the XW axis in the direction perpendicular relative to the sheet plane of the figure and the XC axis in the substantially perpendicular direction are not shown. Coordinate conversion between the world coordinate system and the camera coordinate system can be done with using a well-known calculation method.

Figure 2:
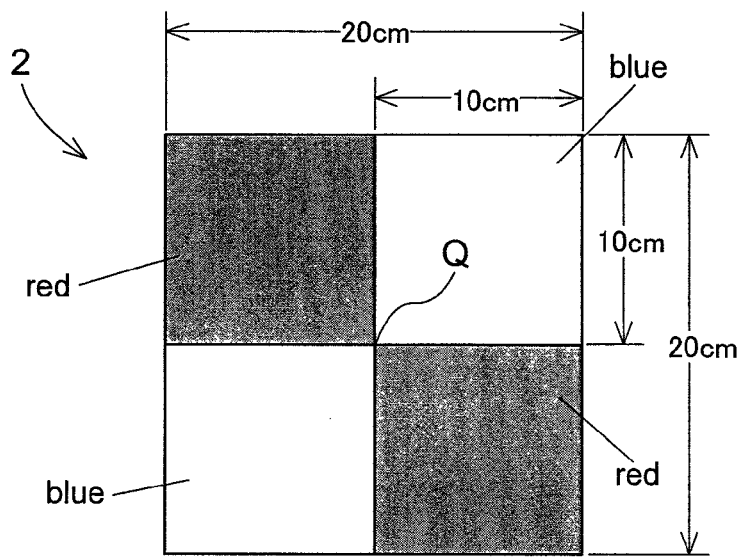
FIG. 2 is an explanatory diagram showing one example of the target.

The targets 2 are provided in at least two positions within the field of view of the camera 11. Further, the targets 2 are disposed such that its coordinates are known in advance in the world coordinate system. In this example, each target 2 has a checkerboard pattern of blue and red as shown in FIG. 2. The center point Q of the pattern is the calibration point, which is used as the reference for calibration of the camera 11. Namely, the target 2 is disposed such that the coordinates of this calibration point Q are known in advance in the world coordinate system. In the meantime, in this example, there is shown of four rectangles in total consisting of two blue rectangles and two red rectangles. Instead, the number of the rectangles can be greater than 4. The number and the shape are not particularly limited to those shown in the figures.

The targets 2 disposed directly or indirectly on the floor surface which is exposed to an ambient light such as light from a candescent lamp or sunlight incident through a window pane, etc. In any case, its image recognition can become difficult, depending on the reflection condition of the ambient light. Therefore, in the case of the present invention, an arrangement for restricting influence from the ambient light such as its reflection is provided through implementation of a painting technique comprised of applying an amount of matt-satin like paint twice on an iron plate.

In the example shown in FIG. 1, the two targets 2 are disposed on the floor surface in the right/left symmetry (D1=D2, W1=W2), relative to the main axis of the vehicle (the ZW axis of the world coordinate system). However, the layout need not always be right/left symmetric, but can be freely set as long as they are disposed within the field of view of the camera and the coordinates are known in advance. That is, the layout of the targets 2 can be set as desired, depending on the size of space available in the factory or the relationship relative to other facilities present therein.

The size of the target 2 will be determined appropriately, depending on e.g. the resolution of the camera 11, the performance of the image processing function for processing an image captured by the camera 11, the disposing position of the markers, etc. so that the calibration point Q can be detected with high precision. For instance, when D1 and D2 are from 1 to 2 meters, respectively and W1 and W2 are about 0.5 m respectively, then, there will be employed a target 2 as shown in FIG. 2, with white and black sections each being sized from 10 to 15 cm in square and the entire target being sized from 20 to 30 cm in square.

Figure 3:
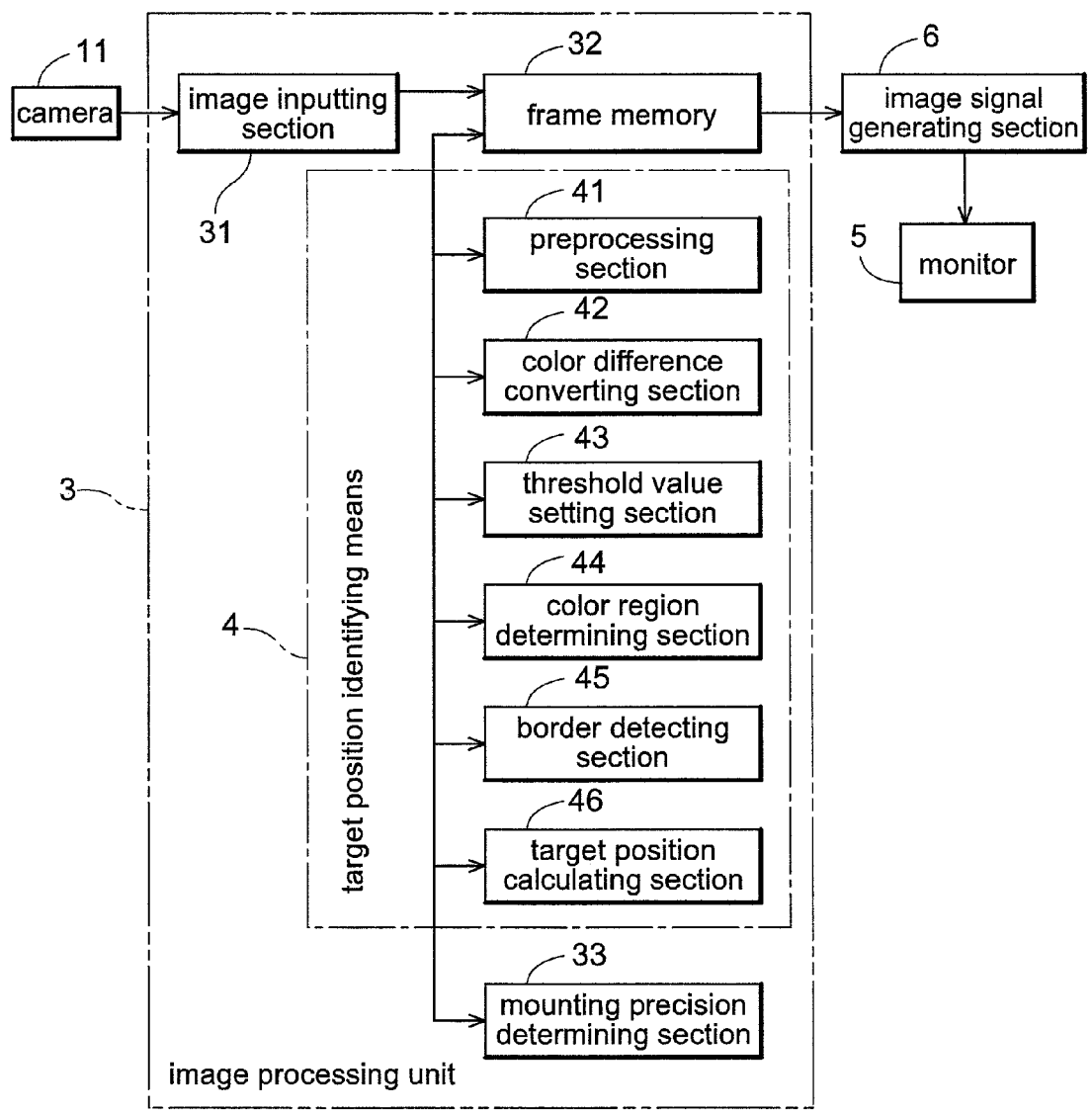
FIG. 3 is a functional block diagram showing respecting functions of a target position identifying means.

In this embodiment, the target position identifying means as a target position identifying apparatus according to the present invention is incorporated within an image processing unit 3. FIG. 3 is a block diagram schematically illustrating those functions of the image processing unit 3 that relate particularly to the present invention. This image processing unit 3 includes an image inputting section 31, a frame memory 32, the target position identifying means 4, and a mounting precision determining section 33. The image inputting section 31 inputs a captured image captured by the camera 11 and including the targets 2 and maps it in the frame memory 32. The target position identifying means 4 identifies the positions of the targets 2, in particular, the position of the calibration point Q of each target 2, from the captured image mapped in the frame memory 32. The mounting precision determining section 33 effects determination of mounting precision of the camera 11, based on a difference, if any, between the position of the calibration point Q of the target 2 identified by the target position identifying means 4 and an aimed calibration point position to be achieved.

The target position identifying means 4 includes a preprocessing section 41, a color difference converting section 42, a threshold setting section 43, a color region determining section 44, a border detecting section 45 and a target position calculating section 46. The preprocessing section 41 effects, when needed, correction of image distortion due to the lens characteristics of the camera 11, and level adjustments (density correction, contrast correction, etc.).

The color difference converting section 42 generates color difference image data by calculating RGB image pixel values of the captured image mapped in the frame memory 32 as RGB image data, thus obtaining blue component values, red component values and luminance values. For this conversion, it is possible to employ the following formulae that are used for conversion from the RGB color representation system to the YCbCr color representation system.

$$Y=0.299 \times R+0.587 \times G+0.114 \times B$$

$$Cb=0.564 \times (B-Y)$$

$$Cr=0.713 \times (R-Y)$$

where Y: luminance value, Cb: blue component value, Cr: red component value: R: R pixel value, G: G pixel value, B: B pixel value. As may be understood from the above formulae, the first color component value, the second component value, e.g. the blue component value: Cb, the red component value: Cr vary in accordance with the luminance (brightness) of the captured image.

Figure 4:
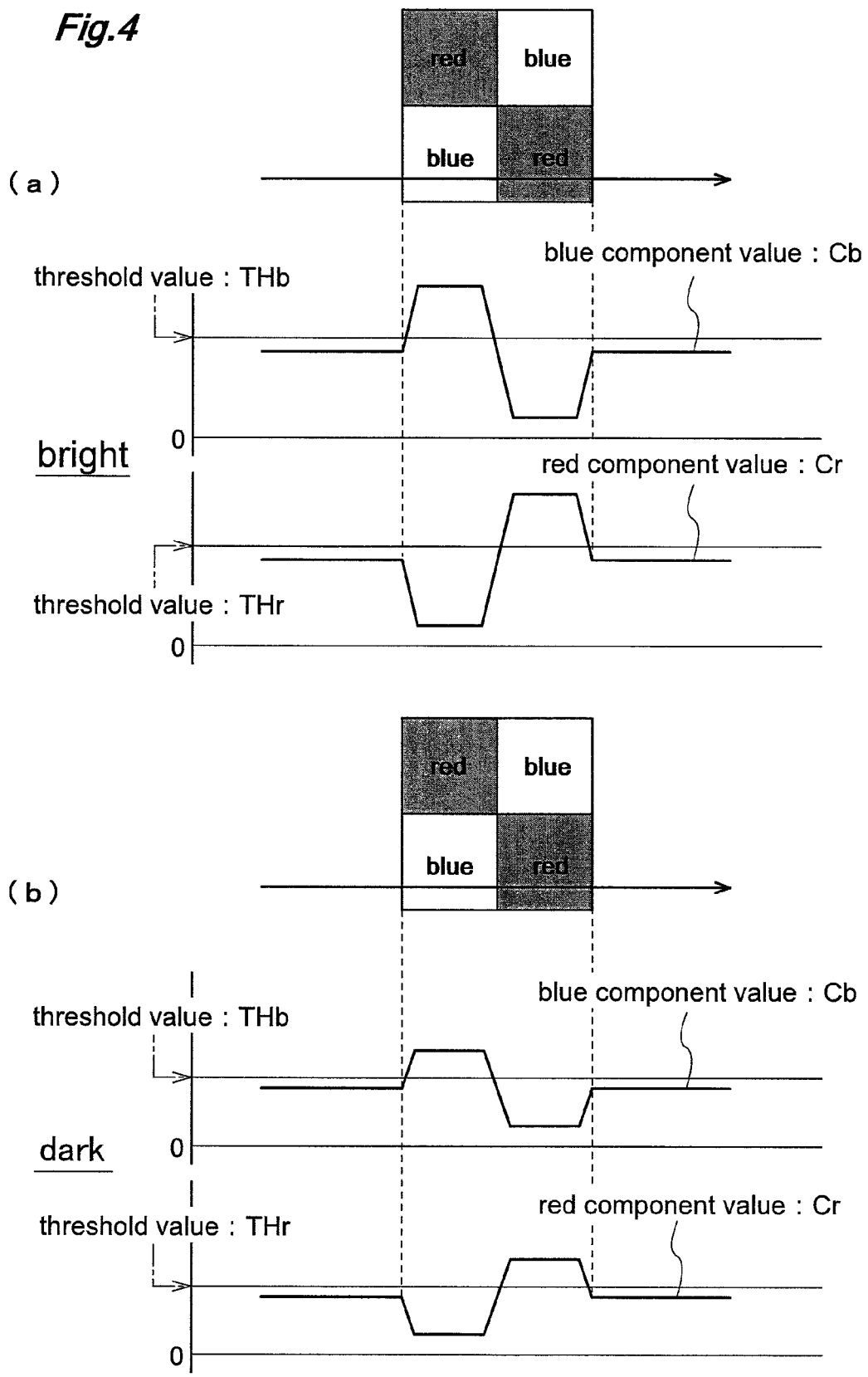
FIG. 4 are graphs showing results of scanning a target image in the YCbCr color representation system.

The threshold setting section 43 sets a particular color detection threshold value as a determination condition for determining whether a target pixel (target region) is red or blue, based on a luminance value (Y) included in the color difference image data generated by the color difference converting section 42. Namely, the blue component value or red component value in the YCbCr color representation system includes some influence of the luminance value, and the brighter the captured image, the greater the value of this component, and the darker the captured image, the smaller the value of the same. FIG. 4 shows variations in the blue color component value and the red color component value: Cr when a color difference image including the target 2 is scanned laterally. FIG. 4 (*a*) shows the variations based on a captured image captured under bright environment, in which the luminance value: Y is relatively high, and the blue component value: Cb and the red component value: Cr too are relatively large. FIG. 4 (*b*) shows the variations based on a captured image captured under dark environment, in which the luminance value: Y is relatively low. Therefore, in order to be able to detect with high precision the blue region or red region of the target 2 from the color difference image data, in the case of a high luminance value as illustrated in FIG. 4 (*a*), the level of the threshold value (THb, THr) as its determination condition should be set relatively high. Conversely, in the case of a low luminance value as illustrated in FIG. 4 (*b*), the level of the threshold value as its determination condition should be set relatively low.

Figure 5:
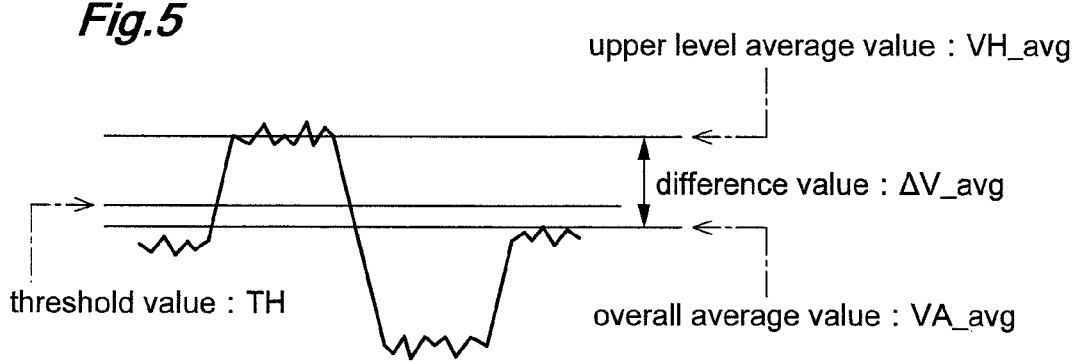
FIG. 5 is an explanatory diagram illustrating a calculation method for calculating a threshold value.

As one preferred technique for dynamically varying the threshold level according to the luminance (brightness) of image, as illustrated schematically in FIG. 5, a particular color threshold value: TH (THb, THr) for determining whether a pixel of the captured image belongs to which particular color region (in this case, blue or red) can be obtained from the following formula, from VA_avg: an average value of the determination subject color component of all the pixels constituting the captured image, VH_avg: an upper level average value corresponding to the color component corresponding red region of the color component values of those pixels having upper level values (e.g. the pixels having color component values of 95% or more of the maximum color component value) of the determination subject color component of all the pixels of the captured image, and a difference value therebetween: $\Delta V\_avg (=VH\_avg-VA\_avg)$.

$$TH=VA\_avg+K \times \Delta V\_avg$$

where K is a constant value, which is an empirically obtained value. As described above, since TH: threshold value thus set is derived by a function including the Cb: blue color component or Cr: red color component, containing luminance component in the captured image, this threshold value becomes greater when the luminance level of the captured image is high or becomes smaller when the luminance level of the captured image is low. Incidentally, for simplicity of the calculation operation for obtaining this threshold value, a commonization technique may be employed with which one of the blue threshold value: THb or the red threshold value: THr is obtained first and this obtained threshold value is used also as that for the other color component.

The technique of dynamically varying the threshold value level according to the luminance (brightness) of captured image can be various calculation methods, in addition to the one described above. These methods can be generically explained as follows. For instance, the threshold value for blue region determination: THb can be obtained from the following function: Fb, including Y: luminance of the capture image Y or f(Y): a statistical (average value, mean value, etc.) numeric value of the luminance value in the color difference information and f(Cb): a statistical numeric value of the blue component value.

$$THb=Fb(f(Y),f(Cb)) \text{ or } THb=Fb(Y,f(Cb))$$

Similarly, the threshold value for red region determination: THr can be obtained from the following function: Fr, including Y: luminance of the capture image Y or f(Y): a statistical (average value, mean value, etc.) numeric value of the luminance value in the color difference information and f(Cr): a statistical numeric value of the red component value.

$$THr=Fr(f(Y),f(Cr)) \text{ or } THr=Fr(Y,f(Cr)).$$

Incidentally, in the above, there were obtained the two threshold values, i.e. the threshold value for blue region determination: THb and the threshold value for red region determination: THr. Instead of this, one of the threshold values can be commonly used.

The color region determining section 44 determines a blue region and a red region, by sequentially scanning a color difference image including the target 2, with using a threshold value set dynamically, i.e. set for each captured image, by the threshold setting section 43. In implementing this, the determination condition for determining the blue region can be an AND condition requiring the blue component value exceeding its threshold value and requiring also the red component value being below its threshold value. Similarly, the determination condition for determining the red region can be an AND condition requiring the red component value exceeding its threshold value and requiring also the blue component value being below its threshold value. Namely, in the color difference signal, the blue component value and the red component value are in the opposite relationship, with each other. Therefore, by utilizing a difference therebetween, more precise blue region determination is made possible. It should be noted, however, that the present invention is not limited to using an AND condition requiring one color component value exceeding its threshold value and requiring also the other component value being below its threshold value in the determination of the blue region and the red region. Alternatively, the determination condition for determining the blue region can be a condition requiring only the blue component value exceeding its threshold value. Similarly, the determination condition for determining the red region can be a condition requiring only the red component value exceeding its threshold value. What is essential in the present invention is changing the determination condition for determining a particular color region with using the luminance information.

The border detecting section 45 detects the border between the blue region and the red region in the target, with using the results of determinations of the blue region and the red region by the color region determining section 44. As the border detected by the border detecting section 45, that is, the crossing point of the two borderlines becomes the calibration point Q, the target position calculating section 46 can calculate the position of the target 2, that is, the calibration point Q, in the captured image.

The above-described respective functional sections of the image processing unit 3 represent only the respectively assigned functions. Hence, these sections need not necessarily be provided independently of each other. Needless to say, each function may be realized through cooperation of hardware resource such as a microcomputer and software resource to be executed on the hardware resource.

The captured image captured by the camera 11 and mapped on the frame memory 32, or an image showing e.g. a displacement, if any, between the calibration point Q identified by the target position identifying means 4 and the aimed calibration point position can be displaced, if desired, on a monitor 5 through the image signal generating section 6.

Figure 6:
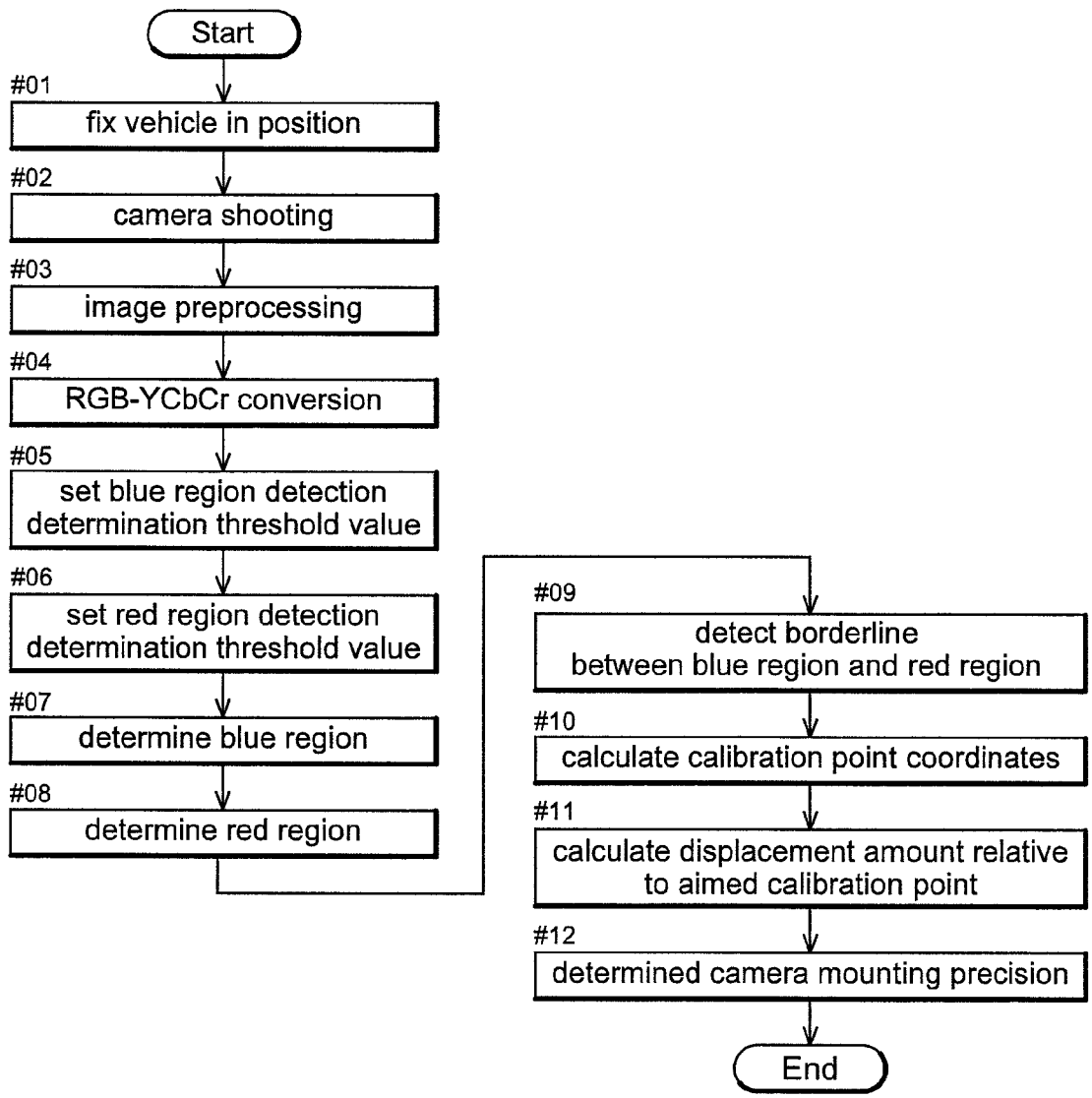
FIG. 6 is a flowchart illustrating a target position identifying process.

Next, an example of target position identification control scheme using the target position identifying means 4 constructed as described above will be described with reference to the flowchart in FIG. 6.

First, the vehicle 1 is driven to and stopped precisely at the predetermined position in an inspection station (#01). After the stopping of the vehicle is confirmed, the camera 11 is operated to capture an image of the periphery of the vehicle (#02). In this, the camera setting is made such that the captured image of the camera 11 mounted on the vehicle 1 stopped at the predetermined position contains images of at least two targets 2 even if the mounting precision of the camera 11 is relatively poor. The captured image (RGB color image data) inputted through the image inputting section 31 is subjected to preprocessing such as correction of image distortion due to the lens characteristics, contrast correction, density correction (level correction), if needed (#03). Next, on the captured image, there is effected a conversion from the RGB color image data to YCbCr color (color difference) image data (#04).

Subsequently, the threshold value setting section 43 applies either Cb: blue component value or Cr: red component value to the above-described formula:

$$TH = VA\_\text{avg} + K \times \Delta V\_\text{avg}$$

thus setting a detection threshold value for the blue region of the target 2 (#05) and a detection threshold value for the red region of the target 2 (#06). Then, in accordance with the captured image obtained, the YCbCr system captured image is sequentially scanned with using the threshold values set by the calculation operations at step #08 and effects determination of the blue region (#07) and determination of the red region (#08) of the target 2. In the determination of the blue region, there is employed the determination condition requiring the blue component value exceeding the blue component threshold value and requiring also the red component value being below the red component threshold value. Similarly, in the determination of the red region, there is employed the determination condition requiring the red component value exceeding the red component threshold value and requiring also the blue component value being below the blue component threshold value.

Next, based on the results of the determinations of the blue region and the red region, the borderline between the blue region and the red region in the target 2 is detected (#09). Needless to say, if desired, the determinations of the blue region and the red region and the determination of the borderline between the blue region and the red region can be done simultaneously. In any case, as the borderline between the detected blue region and the detected red region is to present the form of two lines substantially extending perpendicularly to each other, the crossing point thereof will be used as the calibration point and the calibration point coordinates will be calculated (#010).

With the above described processing steps, the position of the target 2, that is, the coordinate position of the calibration point can be obtained. Therefore, subsequently, the process calculates a displacement amount between a preset target calibration point and the calibration point calculated at step #10 (#11) and then, based on this displacement amount, determination of the mounting precision of the camera 11 is effected (#12).

Other Embodiments (1) In the description of the foregoing embodiment, there is employed the YCbCr color representation system as an example of the color difference representation system consisting of a plurality of color component values and a luminance value. Instead, any other color representation system can be employed. What is essential in the present invention is changing the determination condition for determining a particular color region with using the luminance information.

(2) The operation of determining the camera mounting precision based on the displacement amount between the aimed calibration point and the calculated calibration point can be visually done by displaying both the aimed calibration point and the calculated calibration point on the monitor 5.

(3) In case the camera 11 is capable of outputting YCbCr signals, the converting step of converting the RGB color image data to the YCbCr color data can be omitted.

INDUSTRIAL APPLICABILITY

The target position identifying apparatus according to the invention is applicable to various fields of image processing applying techniques for calculating and identifying a target position from a captured image capturing an image of the target.

The invention claimed is:
1. A target position identifying apparatus comprising:
a color difference converting section for processing pixel values of an image of a target comprised of combination of a first color and a second color obtained from the target under influence of ambient light, thus generating a color component value of the first color, a color component value of the second color and a luminance value;
a color region determining section for determining region of the first color and region of the second color, said color region determining section determining the first color region based on whether said first color component value exceeds a threshold value set as a determination condition for each captured image based on either luminance of the captured image or said luminance value, said color region determining section determining the second color region based on whether said second color component value exceeds a threshold value set as a determination condition for each captured image based on either luminance of the captured image or said luminance value;

a border detecting section for detecting border between the first color and the second color in the target based on result of the determination by said color region determining section; and a target position calculating section for calculating the position of the target on the image based on result of the border detection by the border detecting section.

2. The target position identifying apparatus according to claim 1, wherein said first color is blue, said second color is red; and said luminance value, said first color component value and said second color component value are respectively a Y value, a Cb value and a Cr value in the YCbCr color representation system.

3. The target position identifying apparatus according to claim 1, wherein said determination condition is variable in accordance with the luminance of the captured image or said luminance value in such a manner that a range for the color component value for determining that a pixel of the captured image belongs to either one of said color regions is narrowed in accordance with increase in the luminance of the captured image or said luminance value.

4. The target position identifying apparatus according to claim 3, wherein said determination condition comprises a particular color detection threshold value: TH, said particular color detection threshold value: TH being obtained by the following formula:

$$TH = VA\_avg + K \times (VH\_avg - VA\_av)$$

where VA_avg: the average value of the color component value to be determined for all pixels of the captured image, VH_avg: an upper level average value of the color component values of those pixels having upper level values of the determination subject color component of all the pixels of the captured image, and K: a preset constant value.

5. The target position identifying apparatus according to claim 1, wherein said target comprises a checkerboard pattern.

6. The target position identifying apparatus according to claim 5, wherein coordinates of a crossing point of a pair of borderlines of differing directions together delimiting the checkerboard pattern are used as said target position.

7. The target position identifying apparatus according to claim 1, wherein the position coordinates of the target are known in advance.

8. The target position identifying apparatus according to claim 1, wherein the surface of the target is provided with matting treatment.

9. The target position identifying apparatus according to claim 1, wherein said captured image is a captured by a vehicle-mounted camera and the position of the target in the captured image is utilized for calibration of mounting position of the camera.

10. The target position identifying apparatus according to claim 9, wherein the target is provided in the form of a pair of targets juxtaposed along the right/left direction of the vehicle, and these targets are set with a distance therebetween smaller than the tread width of the vehicles.

11. The target position identifying apparatus according to claim 9, wherein the target is provided in the form of a pair of targets juxtaposed along the right/left direction of the vehicle, and these targets are set with a distance therebetween greater than the tread width of the vehicles.

* * * * *